(12) United States Patent
Salino

(10) Patent No.: US 10,579,025 B2
(45) Date of Patent: Mar. 3, 2020

(54) HYDROCARBON RECOVERY PROCESS

(71) Applicant: BP Exploration Operating Company Limited, Middlesex (GB)

(72) Inventor: Peter Salino, Middlesex (GB)

(73) Assignee: BP EXPLORATION OPERATING COMPANY LIMITED, Middlesex (GB)

( * ) Notice: Subject to any disclaimer, the term of this patent is extended or adjusted under 35 U.S.C. 154(b) by 442 days.

(21) Appl. No.: 15/307,287

(22) PCT Filed: Apr. 15, 2015

(86) PCT No.: PCT/EP2015/058203
§ 371 (c)(1),
(2) Date: Oct. 27, 2016

(87) PCT Pub. No.: WO2015/165734
PCT Pub. Date: Nov. 5, 2015

(65) Prior Publication Data
US 2017/0044877 A1    Feb. 16, 2017

(30) Foreign Application Priority Data

Apr. 29, 2014    (EP) .................................... 14166454

(51) Int. Cl.
*G05B 13/04* (2006.01)
*E21B 43/20* (2006.01)
(Continued)

(52) U.S. Cl.
CPC ........ *G05B 13/048* (2013.01); *E21B 41/0092* (2013.01); *E21B 43/20* (2013.01);
(Continued)

(58) Field of Classification Search
None
See application file for complete search history.

(56) References Cited

U.S. PATENT DOCUMENTS

| 4,184,549 A | 1/1980 | Schievelbein |
| 9,103,201 B2 * | 8/2015 | Collins .................. E21B 44/00 |
| 2012/0330553 A1 | 12/2012 | Mollaei et al. |

FOREIGN PATENT DOCUMENTS

| EP | 2278120 A1 | 1/2011 |
| WO | 2010/092095 A1 | 8/2010 |

(Continued)

OTHER PUBLICATIONS

PCT/EP2015/058203 International Search Report and Written Opinion dated May 8, 2015 (12 p.).
(Continued)

*Primary Examiner* — Qing Yuan Wu
(74) *Attorney, Agent, or Firm* — Conley Rose, P.C.

(57) ABSTRACT

A method for recovering crude oil from a reservoir that is penetrated by at least one injection well and at least one production well wherein the reservoir comprises a first carbonate rock layer and a second carbonate rock layer each having crude oil and a resident water present within the pore space thereof, the method comprising: isolating the second rock layer from direct hydraulic communication with the injection well; and injecting an injection water having a total-dissolved-solids (TDS) content lower than the TDS content of the resident water from the injection well into the first rock layer thereby forming a sulfate enriched aqueous displacement fluid through dissolution of water-soluble sulfate minerals from the first rock layer into the injection water wherein the displacement fluid flows through the first rock layer and from the first rock layer into and through the second rock layer thereby displacing oil towards the production well.

17 Claims, 4 Drawing Sheets

(51) Int. Cl.
  *E21B 41/00*  (2006.01)
  *E21B 49/00*  (2006.01)
  *E21B 49/08*  (2006.01)
  *E21B 43/14*  (2006.01)

(52) U.S. Cl.
  CPC .............. *E21B 49/00* (2013.01); *E21B 49/08* (2013.01); *E21B 43/14* (2013.01); *E21B 2049/085* (2013.01)

(56) References Cited

FOREIGN PATENT DOCUMENTS

WO   2010/151574 A2   12/2010
WO   2012/012235 A1   1/2012

OTHER PUBLICATIONS

Shariatpanahi, Seyed Farzad, et al., "Evaluation of Water-Based Enhanced Oil Recovery (EOR) by Wettability Alteration in a Low-Permeable Fractured Limestone Oil Reservoir," American Chemical Society, Energy Fuels 2010, vol. 24, pp. 5997-6008, Nov. 3, 2010 (12 p.).

Yousef, Ali A., et al., "Improved/Enhanced Oil Recovery from Carbonate Reservoirs by Tuning Injection Water Salinity and Ionic Content," Society of Petroleum Engineers, 18th SPE Improved Oil Recovery Symposium, Tulsa, Oklahoma, Apr. 14-18, 2012 (SPE 154076) (18 p.).

* cited by examiner

HYDROCARBON RECOVERY PROCESS

CROSS-REFERENCE TO RELATED APPLICATIONS

This application is a 35 U.S.C. § 371 national stage application of PCT/EP2015/058203 filed Apr. 15, 2015 and entitled "Hydrocarbon Recovery Process," which claims priority to European Application No. 14166454.0 filed Apr. 29, 2014 and entitled "Hydrocarbon Recovery Process," both of which are hereby incorporated herein by reference in their entirety for all purposes.

STATEMENT REGARDING FEDERALLY SPONSORED RESEARCH OR DEVELOPMENT

Not applicable.

BACKGROUND

Technical Field

The present disclosure relates to a method for recovering crude oil from an oil bearing reservoir comprising interbedded carbonate rock layers and, in particular, where a first carbonate rock layer has a relatively high water-soluble sulfate mineral content and a second carbonate rock layer has a relatively low water-soluble sulfate mineral content.

Background of the Technology

It is known that only a portion of oil can be recovered from an oil-bearing reservoir as a result of the natural energy of the reservoir. So-called secondary recovery techniques rely on the supply of external energy to maintain the pressure in a reservoir and to sweep oil towards a production well. The simplest secondary recovery method involves the direct replacement of the oil with another medium, usually water or gas.

"Waterflooding" is one of the most successful and extensively used secondary recovery methods. Water is typically injected, under pressure, into reservoir rocks via injection wells to maintain reservoir pressure and sweep the oil through the rock towards production wells. The water used in waterflooding may be a high salinity water, for example, seawater, estuarine water, a saline aquifer water, or a produced water (water separated from oil and gas at a production facility).

Enhanced oil recovery (EOR) techniques may also be used. The purpose of such EOR techniques is not only to restore or maintain reservoir pressure (as is achieved by a typical waterflood), but also to improve the displacement of the oil from the reservoir, thereby maximizing the recovery of oil from, and minimizing the residual oil saturation of, the reservoir (i.e. the volume of oil present in the reservoir).

One known EOR technique that may be used in carbonate reservoirs is the use of an aqueous displacement fluid that is enriched in sulfate anions. This aqueous displacement fluid may be a pre-formed sulfate enriched water that is injected into the carbonate reservoir or may a sulfate enriched water that is formed in situ by injecting a low salinity water into a carbonate reservoir, thereby achieving in situ dissolution of water-soluble sulfate minerals such as calcium sulfate and magnesium sulfate minerals that are naturally occurring in the carbonate reservoir.

WO 2010/092095 describes a method for enhancing oil recovery from limestone or dolomite comprising determining a $SO_4^{2-}/Ca^{2+}$ molar ratio in the connate water; and injecting into the formation pore spaces an aqueous displacement fluid with a $SO_4^{2-}/Ca^{2+}$ molar ratio above 1 and a higher $SO_4^{2-}/Ca^{2+}$ molar ratio than the connate water. It is said that the method may be applied to modify the wettability of the limestone or dolomite formation such that its oil wettability is reduced and its water wettability is increased.

WO 2012/012235 describes a method for increasing oil production in a carbonate reservoir by conducting a stepwise reduction of salinity of the injected salt water that is injected into the carbonate reservoir. It is said that the method provides for increased oil production as compared to conventional waterflooding techniques.

SPE 154076 ("Improved/Enhanced Oil Recovery from Carbonate Reservoirs by Tuning Injection Water Salinity and Ionic Content") describes that improved/enhanced oil recovery can be achieved by altering the ionic content of field injection water, and that wettability alteration is the main cause for the substantial increase in oil recovery. According to SPE 154076, the presence of anhydrite in carbonate rock matrix will provide in-situ generation of $SO_4^{2-}$ which may be important for wettability alteration. SPE 154076 further states that an increase in the reservoir temperature promotes rock wettability alteration, but reduces the dissolution of anhydrite and the in situ generation of $SO_4^{2-}$.

Shariatpanahi et al, Energy Fuels 2010, 24, 5997-6008 describes a method for evaluating wetting properties and oil recovery potential by spontaneous imbibition of "smart water" into a low-permeable limestone reservoir. According to Shariatpanahi et al, the benefit of anhydrite present in high temperature carbonate rock is two-fold: (1) the carbonate reservoir can act preferentially to water-wetness; and (2) dissolution of anhydrite in the water front can improve the water-wetness and increase oil recovery in a spontaneous imbibition process.

A problem arises in reservoirs comprising interbedded layers of carbonate rocks having differing levels of water-soluble sulfate minerals as certain layers may contain insufficient amounts of water-soluble sulfate minerals to form the sulfate enriched aqueous displacement fluid such that insignificant incremental oil recovery is achieved from these layers. Thus, achieving optimal incremental oil recovery from a low salinity waterflood in such reservoirs presents technical challenges.

SUMMARY

According to an exemplary embodiment, there is provided a computer-implemented method for determining one or more operating modes for a crude oil displacement system, the crude oil displacement system being arranged to inject an injection water into a reservoir, the reservoir comprising at least two carbonate rock layers having crude oil present within the pore space thereof, said crude oil displacement system being for use in displacing crude oil from the pore space of the carbonate rock layers, the method comprising the steps of:
  receiving input data indicative of:
    i) characteristics of the injection water, comprising temperature, salinity, and sulfate concentration; and
    ii) characteristics of the carbonate rock layers comprising temperature, permeabilities of the carbonate rock layers, water-soluble sulfate mineral content of the carbonate rock layers, and an indication of the permeabilities of one or more interfaces between adjacent ones of the carbonate rock layers;
  inputting said input data into a computer-implemented predictive model;

operating the predictive model so as to:
  a) identify one or more first carbonate rock layers and one or more second carbonate rock layers of the at least two carbonate rock layers, the one or more second carbonate rock layers being adjacent to at least one of the one or more first carbonate rock layers, the one or more first carbonate rock layers having a relatively high water-soluble sulfate mineral content and the one or more second carbonate rock layers having a relatively low water-soluble sulfate mineral content;
  b) model, using at least the data indicative of the characteristics of the injection water and of the characteristics of the carbonate rock layers, dissolution of water-soluble sulfate minerals from at least one first carbonate rock layer of the one or more first carbonate rock layers into the injection water that will occur on configuring the crude oil displacement system to inject said injection water into the said at least one first carbonate rock layer, whereby to generate first data representing chemical characteristics of a sulfate enriched aqueous displacement fluid formed in the at least one first carbonate rock layer by the dissolution of water-soluble sulfate minerals into the injection water;
  c) model, using at least the data indicative of the water permeabilities of the carbonate rock layers, flow of the sulfate enriched aqueous displacement fluid through the at least one first carbonate rock layer, whereby to generate first flow characteristics of the sulfate enriched aqueous displacement fluid;
  d) model, using at least the data indicative of the water permeabilities of the carbonate rock layers, the water permeabilities of the one or more interfaces and the first flow characteristics, flow of the sulfate enriched aqueous displacement fluid from the at least one first carbonate rock layer into and through at least one second carbonate rock layer of the one or more second carbonate rock layers, whereby to generate second flow characteristics of the sulfate enriched aqueous displacement fluid; and
  e) generate, based on at least the first data and the modelled second flow characteristics, second data indicative of a predicted amount of oil that will be displaced from the said at least one second carbonate rock layer by the sulfate enriched aqueous displacement fluid formed in the at least one first carbonate rock layer responsive to configuring the crude oil displacement system so as to inject the injection water into the at least one first carbonate rock layers; and
  determining, on the basis of the second data, control data indicative of one or more operating modes of the crude oil displacement system.

Typically, the reservoir has, in addition to crude oil, a resident water present within the pore space thereof. Preferably, embodiments of the method of the present invention additionally comprises receiving input data indicative of:
  iii) characteristics of the resident water, comprising temperature, salinity, and sulfate concentration; and
  inputting this additional input data into the computer-implemented model.

Accordingly, the modelling of the dissolution of water-soluble sulfate minerals in step b) may use this additional input data.

The person skilled in the art will understand that during the step of operating the predictive model, the modelling referred to in c) and d) may be performed simultaneously. For example, the modelling referred to in c) and d) may incorporate a plurality of flow paths by which the sulfate enriched aqueous displacement fluid passes from the at least one first carbonate rock layer into and through the at least one second carbonate rock layer, and, optionally, a plurality of flow paths by which the sulfate enriched aqueous displacement fluid passes back into the at least one first carbonate rock layer or from the second layer into a further adjacent layer. Further, during the step of operating the predictive model, the modelling referred to in b) may be performed simultaneously with the modelling referred to in c) and d) thereby allowing interactions between the modelling of the dissolution of the water-soluble sulfate minerals and the flow modelling.

According to a further exemplary embodiment, there is provided a method for recovering crude oil from a reservoir that is penetrated by at least one injection well and at least one production well wherein the reservoir comprises one or more first carbonate rock layers and one or more second carbonate rock layers each having crude oil and a resident water present within the pore space thereof, the one or more second carbonate rock layers being adjacent to at least one of the first carbonate rock layers, there being either no barrier or a semipermeable barrier to water at the interface between the second and first carbonate rock layers, the one or more first carbonate rock layers having a relatively high water-soluble sulfate mineral content and the one or more second carbonate rock layers having a relatively low water-soluble sulfate mineral content, the method comprising: isolating the second carbonate rock layers from direct hydraulic communication with the injection well; injecting an injection water having a total dissolved solids (TDS) content lower than the TDS content of the resident water from the injection well into the first carbonate rock layer(s) thereby forming a sulfate enriched aqueous displacement fluid through dissolution of water-soluble sulfate minerals from the first carbonate rock layer(s) into the injection water wherein the sulfate enriched aqueous displacement fluid flows through the first carbonate rock layer(s) and from the first carbonate rock layer(s) into and through the second carbonate rock layer(s) thereby displacing oil towards the production well.

Further features and advantages of embodiments of the present invention will become apparent from the following description of preferred embodiments, given by way of example only, which is made with reference to the accompanying drawings.

BRIEF DESCRIPTION OF THE DRAWINGS

Systems, apparatuses and methods will now be described as embodiments, by way of example only, with reference to the accompanying figures in which.

DETAILED DESCRIPTION

Figure 1:
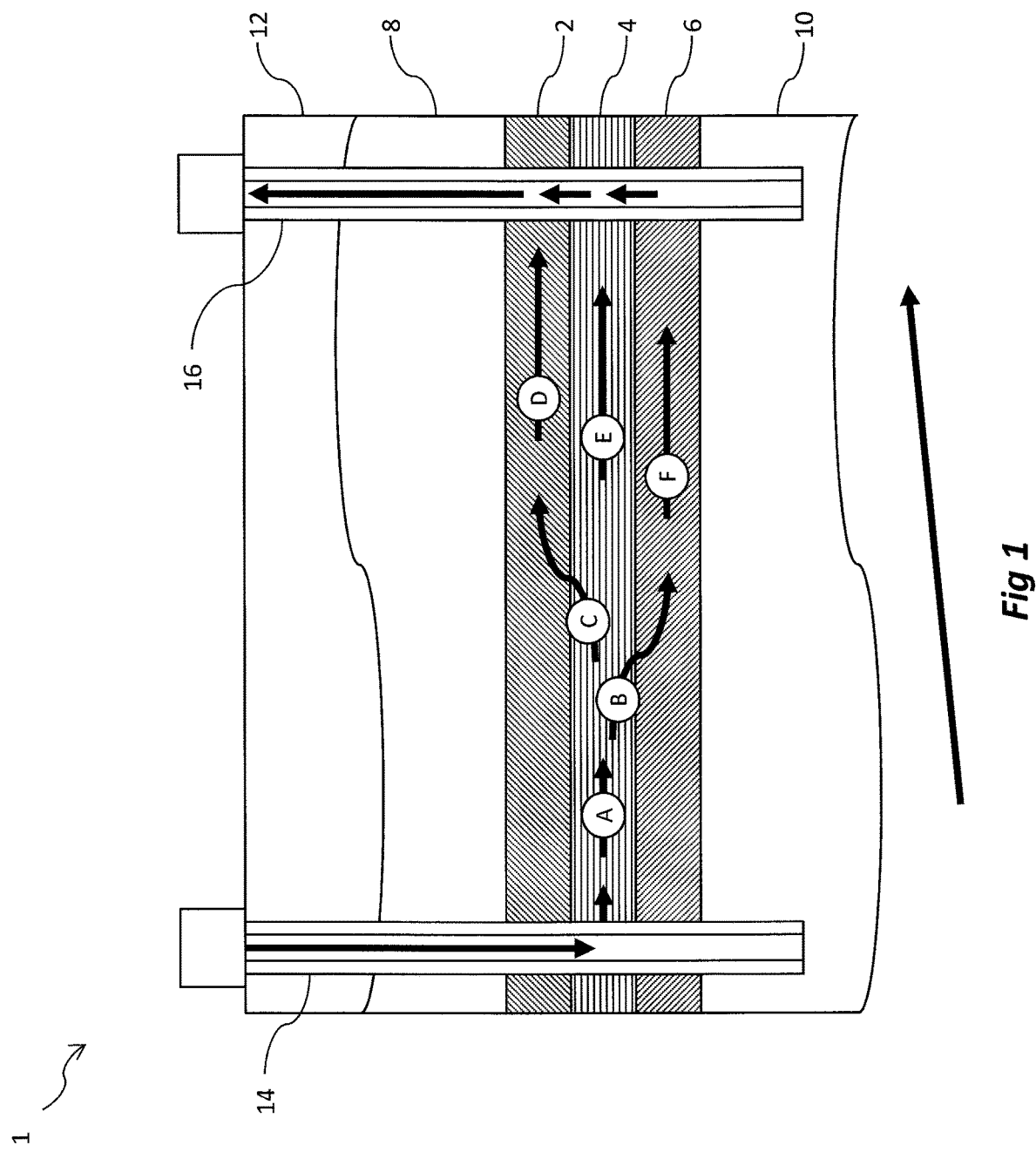
FIG. 1 shows a schematic diagram of a crude oil displacement system and a reservoir in respect of which embodiments of the invention are applicable.

FIG. 1 is a schematic block diagram showing a simplified representation of a crude oil displacement system 1 that operates on a multi-layered reservoir. In this example, the reservoir comprises a plurality of permeable carbonate rock layers 2, 4 and 6 having crude oil present within the pore space thereof. Typically, the reservoir rock also has water (referred to herein as "resident water") within the pore space thereof. The carbonate rock layers 2, 4 and 6 may be surrounded by impermeable layers 8 and 10. Above the upper impermeable layer 10 there is a generalized surface layer 12 which may comprise multiple rock layers of different compositions and, if the reservoir is offshore, a layer of seawater. The composition of layer 12 is not relevant to this example.

The permeable carbonate rock layers 2, 4 and 6 make up the reservoir. Penetrating the reservoir is an injection well 14 and a production well 16. An injection facility (not shown) and a production facility (not shown) are connected to the injection well 14 and production well 16 respectively via flow lines (not shown). Typically there are many more wells than the two shown here; however a single injection well and production well pair is shown in this exemplary embodiment to aid explanation.

When used for a waterflood, the injection facility of the crude oil displacement system 1 injects injection water under pressure into the injection well 14 and from the injection well 14 into the reservoir. Arrows A to F show an exemplary flow arrangement of an injected water in which the water is injected directly from the injection well 14 into carbonate rock layer 4 and flows along carbonate rock layer 4, as shown by arrow A. The injected water also flows from carbonate rock layer 4 into carbonate rock layers 2 and 6, shown by arrows B and C. Finally, the injected water flows along carbonate rock layers 2, 4 and 6 as shown by arrows D, E and F. It will be appreciated that two, or more than three, carbonate rock layers may be present, and the flow along and between the carbonate rock layers may be substantially more complicated. Furthermore, in some reservoirs a given carbonate rock layer may not exist across the full span between the injection and production wells.

The injected water sweeps the oil in the reservoir ahead of it causing the crude oil to be displaced from the pore space of the carbonate rock layers within the reservoir into the well bore of the production well 16. From there, the pressure of the reservoir, optionally aided by pumps located in the well bore of the production well, lifts the fluids produced from the reservoir up to the surface to the production facility where the produced fluids are separated into oil, water and gas.

An exemplary arrangement by which the injection well 14 may be completed to enable injection into layer 4 will now be described in more detail with reference to FIG. 2.

Figure 2:
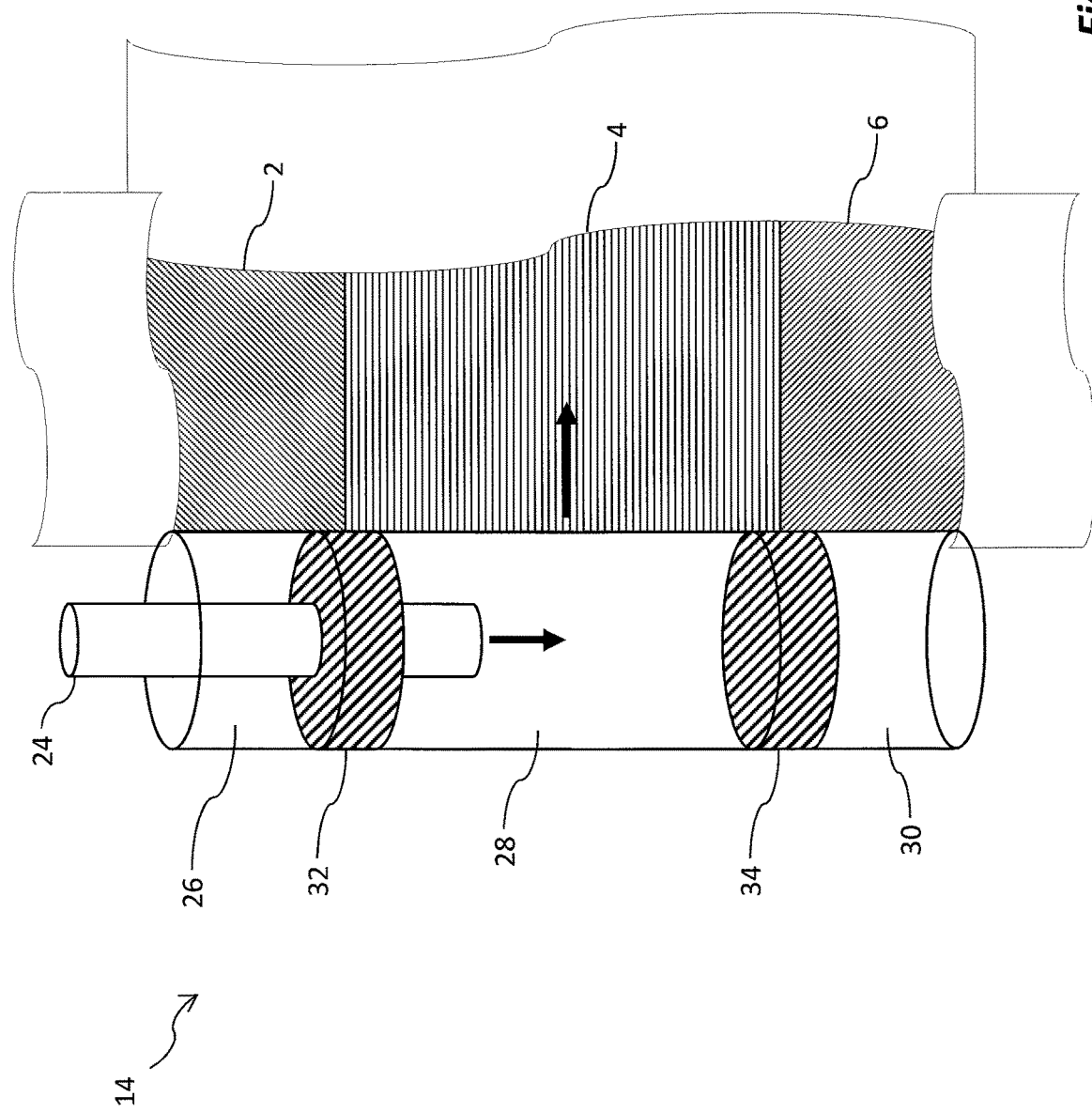
FIG. 2 shows a schematic diagram of a section of the crude oil displacement system.

FIG. 2 is a schematic diagram showing a simplified representation of a portion of an injection well 14. The injection well 14 has an open hole completion spanning the interval of the reservoir represented by carbonate rock layers 2, 4 and 6. Within the injection well 14 runs an injection tubing 24 which conveys injection water down the well. The well is divided into sections 26, 28 and 30, with section 28 being fully represented, and the surrounding sections 26 and 30 being partially represented in FIG. 2. Separating the sections are seals (also known as 'packers') 32 (between sections 26 and 28) and 34 (between sections 28 and 30), which hydraulically isolate section 28 of the wellbore from adjacent sections.

In this example, the packers are arranged such that the sections 26, 28 and 30 of the wellbore correspond to the carbonate rock layers 2, 4 and 6 respectively. The injection tubing terminates below packer 32 and above packer 34 such that the water exiting the injection tubing flows into section 28, but not into sections 26 and 30. The water then flows from section 28 into carbonate rock layer 4. Thus, the injection water may only flow directly into carbonate rock layer 4.

While the above shows a simplified completion of an injection well which allows injection water to flow into layer 4 and not into adjacent layers 2 and 6, there are many different ways of completing a well that allow selective injection of an injection water into different carbonate rock layers. This selective injection may comprise injecting an injection water into one or more given carbonate rock layers (e.g. layer 4) without injecting the water into other carbonate rock layers (e.g. layers 2 and 6). Alternatively, this selective injection may comprise controlling the flow rate of an injection water into the carbonate rock layers such that there is a higher injection rate into one or more of the carbonate rock layers (e.g. layer 4) than into other carbonate rock layers (e.g. layers 2 and 6). For example, a cased wellbore may have perforations in section 28 and no perforations in sections 26 and 30 or may have a greater number of perforations in section 28 than sections 26 or 30.

Further, the completion of the injection well may include one or more sliding sleeves comprising an internal sleeve that may be shifted between an open position and a closed position. When in the open position, the sleeve allows communication between an injection tubing and an annulus located between the wall of the injection well and the injection tubing. Sliding sleeves may therefore be used, optionally together with seals, to prevent injection water from flowing from sections 26 and 30 of the wellbore into carbonate rock layers 2 and 6 while opening up flow of injection water from section 28 into carbonate rock layer 4.

Optionally, a variety of sensors (not shown) may be provided within the injection well 14, and within the production well 16. These sensors may be used to measure data. The data measured by these sensors may be used as input data, described below, or may be used to calculate or derive the input data using, for example, computer models as known in the art. Equally, the input data described below may be established from analysis of core samples taken when the well is drilled, knowledge of the characteristics of any previously injected water, knowledge of the characteristics of the oil and resident water contained in the pore space of the layers of reservoir rock 2, 4, and 6, and analysis of any production fluids received at the production well (i.e. fluids produced from the layers of reservoir rock 2, 4, and 6).

Embodiments of the invention provide computer systems, and computer implemented methods which may be used to determine one or more operating modes for a crude oil displacement system arranged to inject an injection water into a reservoir. To this end, embodiments of the invention may include a computer system running injection mode determining (IMD) software components which enable the system to determine a suitable mode for injection of the injection water. In general terms, the IMD software components comprise interface components which enable suitable input data to be received, and which enable an output, useable to control the mode of operation of the system, to be provided. The IMD software components also comprise modelling components which enable the operation of the crude oil recovery system to be modelled. These modelling components may, for example, enable the determination of data indicative of the flow of fluid within the reservoir and the determination of data indicative of the dissolution of material, into injection water, within the reservoir. The operation of these components will be expanded on below.

The computer system may be located in a planning and control centre (which may be located remote from the reservoir). Alternatively, the computer system may be part of the control systems of the reservoir, for example, may be located at the injection and/or production facilities. The IMD software components may comprise one or more applications as are known in the art, and/or may comprise one or more add-on modules for existing software.

Figure 3:
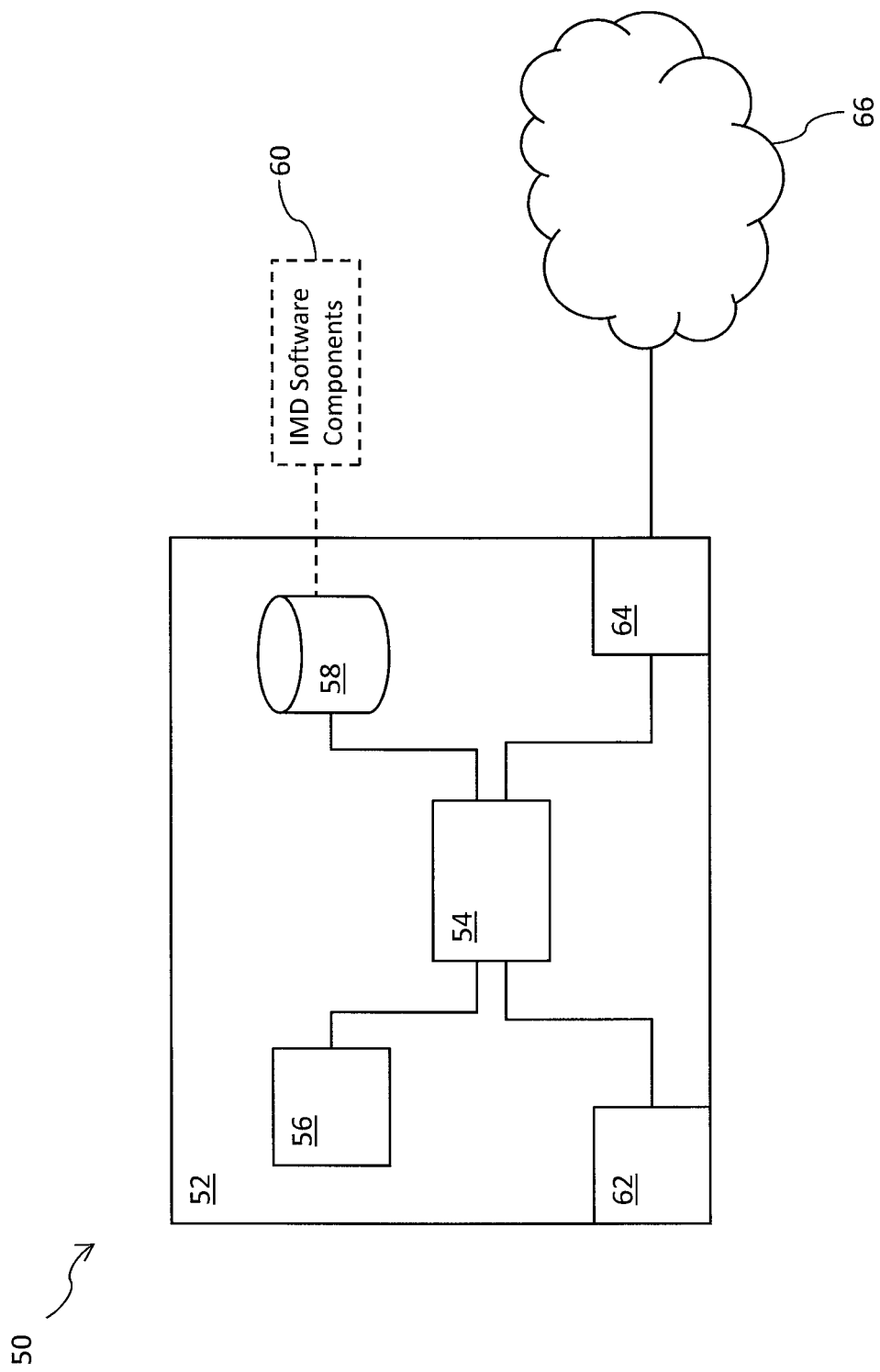
FIG. 3 shows a schematic diagram of a processing system in which embodiments of the invention may operate.

A schematic block diagram showing such a computer system will now be described with reference to FIG. 3. The computer system 50 comprises a processing system 52 having a processor, or CPU, 54 which is connected to a volatile memory (i.e. RAM) 56 and a non-volatile memory (such as a hard drive or a removable memory such as a disk or flash drive) 58. The IMD software components 60, carrying instructions for implementing embodiments of the invention, may be stored in the non-volatile memory 58 and/or volatile memory 56. In addition, CPU 54 may be connected to a user interface 62 and a network interface 64. The network interface 64 may be a wired or wireless interface and is connected to a network, represented by cloud 66. Thus the processing system 52 may be connected with sensors, databases and other sources and receivers of data through the network 66.

In use the processor 54 retrieves and executes the stored IMD software components 60, for example, from the non-volatile memory 58. During the execution of the IMD software components 60 (that is when the computer system is performing the actions described below) the processor may store data temporarily in the volatile memory 56. The processor 54 may also receive data (as described in more detail below), through user interface 62 and network interface 64, as required to implement embodiments of the invention. For example, survey data indicative of the properties of the reservoir may be entered by a user through the user interface 62 and/or received from e.g. a remote database through the network 66. Data may also be received from one or more sensors within the injection and production wellbores.

These data may be generated and/or stored in a number of ways known to the skilled person. For example, characteristics of a carbonate rock layer of the reservoir (described below) may be determined in a laboratory from a core sample taken from the reservoir using well known processes. Once determined, this data may be actively sent to the processing system 52, or stored in a database to be retrieved as required by the processing system 52. Alternatives will be readily apparent to the skilled person.

The processor 54 may also provide an output via either of the user interface 62 or the network interface 64. As will be described in detail below, embodiments enable one or more operating modes of the crude oil displacement system to be determined. Consequently, control data indicative of, or derived from, the determined operating mode may be outputted by the interface. This outputting may include outputting the control data to a resource such as a screen or printer, or, if required, transmitting the data over the network to remote stations. The control data may take a number of forms. For example, the control data may take the form of instructions to inject or not to inject water having specified characteristics into certain carbonate rock layers. Alternatively, or additionally, the control data may identify how a well is to be completed—e.g. the number and position of packers etc. Other options include control data identifying a flow rate and/or injection pressure for injection of injection water into different layers. Such processes will be readily apparent to the skilled person and will therefore not be described in detail.

Figure 4:
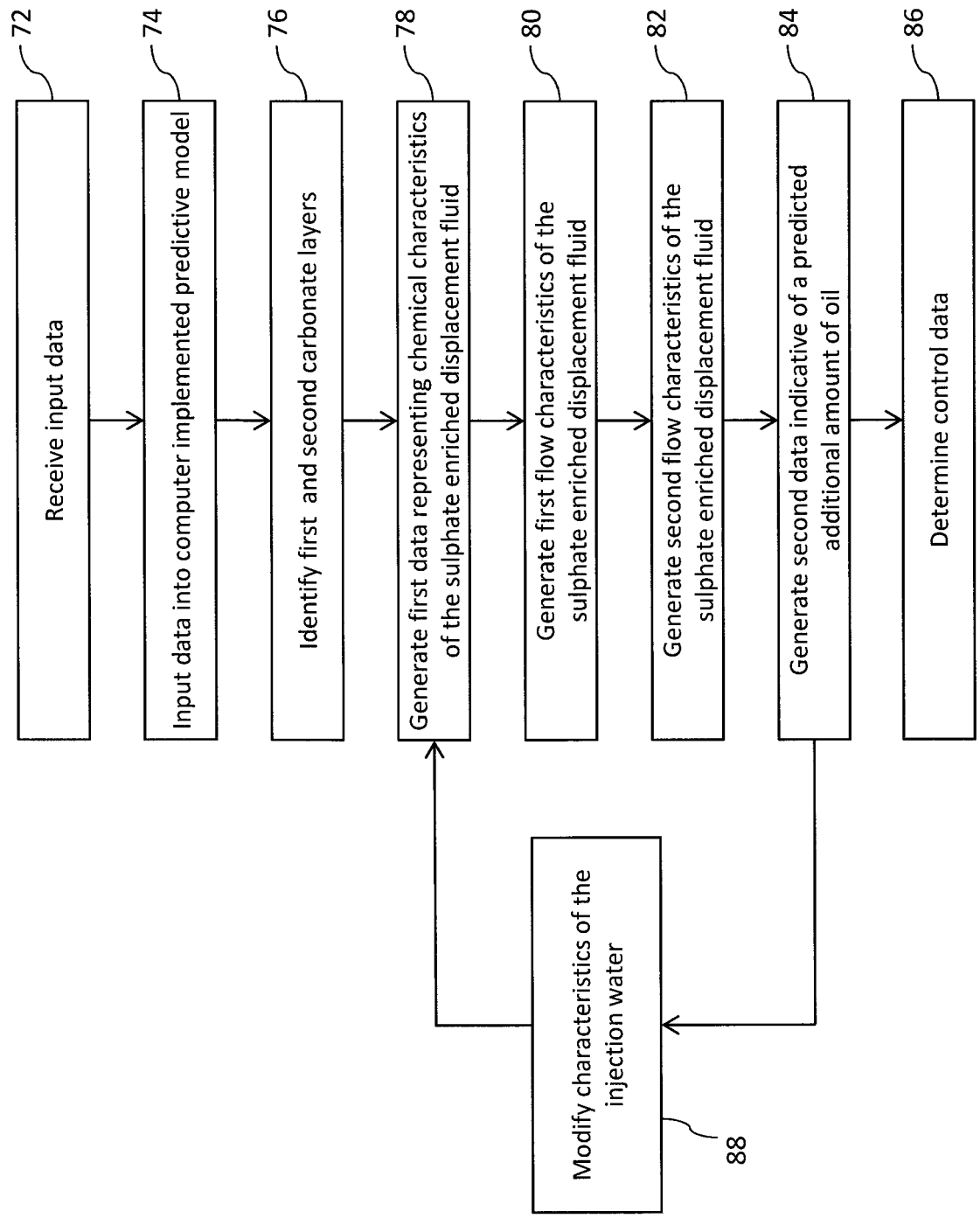
FIG. 4 shows a computer implemented method of determining an operating mode for the crude oil displacement system shown in FIGS. 1 and 2;
  Several parts and components of embodiments of the invention appear in more than one Figure; for the sake of clarity the same reference numeral will be used to refer to the same part and component in all of the Figures.

Examples of a computer implemented method for determining one or more operating modes for the crude oil displacement system 1 will be described below with reference to FIG. 4. In this embodiment it is assumed that the computer implemented method is performed by the processing system 52.

In step 72, the processing system 52 receives input data. This input data may be stored in (and thus retrieved from) one or both of memories 56 and 58, or received via the interfaces 62 and 64. The received input data is indicative of the following:

i) characteristics of the injection water comprising temperature, salinity, and sulfate concentration; and ii) characteristics of the carbonate rock layers comprising temperature, water permeabilities of the carbonate rock layers, water-soluble sulfate mineral content of the carbonate rock layers, and an indication of the water permeabilities of one or more interfaces between adjacent ones of the carbonate rock layers.

Additionally, the input data may be indicative of:

iii) characteristics of the resident water present within the carbonate rock layers comprising temperature, salinity (also referred to as total dissolved solids content), and sulfate concentration.

The resident water may be formation water (water that occurs naturally within the pore space of the reservoir rock) or a mixture of formation water and a previously injected water such as seawater. The water that occurs naturally within the pore space of the reservoir rock is often called "connate water" although, strictly speaking, this term refers to water trapped in the pore space during formation of the rock. The composition of the resident water may vary between carbonate rock layers owing to differences in the characteristics of the carbonate rock layers. Thus, the person skilled in the art will understand that the resident water is typically in chemical equilibrium with the minerals present in each rock layer.

Additionally, the input data may be indicative of characteristics of the crude oil within the carbonate rock layers.

Optionally, some of the input data may be received from sensors within the crude oil recovery system, such as downhole temperature sensors located within the production well and/or injection well.

Having received the input data, the processing system 52 inputs the input data into a computer-implemented predictive model. As described above, this predictive model may be provided as one or more components within the IMD software components 60.

In steps 76 to 84, the processing system 52 operates the predictive model to generate second data indicative of a predicted amount of oil which might be produced by operating the displacement system in a particular mode. The nature of this second data will become apparent from the description below.

In operating the predictive model, in step 76, the processing system 52 identifies one or more first carbonate rock layers (e.g. carbonate rock layer 4) and one or more second carbonate rock layers (e.g. carbonate rock layers 2 and 6) from the carbonate rock layers in the reservoir. The first and second carbonate rock layers are identified such that: the second carbonate rock layers 2 and 6 are adjacent to the first carbonate rock layer 4; the first carbonate rock layer 4 has a relatively high water-soluble sulfate mineral content; and the second carbonate rock layers 2 and 6 have a relatively low water-soluble sulfate mineral content.

In step 78, the processing system 52 generates first data representing chemical characteristics of a sulfate enriched aqueous displacement fluid which may be formed in the first carbonate rock layer 4 by the dissolution of water-soluble sulfate minerals into the injection water. This may involve modelling the dissolution of water-soluble sulfate minerals from the first carbonate rock layer 4 into the injection water that will occur if the crude oil displacement system injects injection water into the first carbonate rock layer 4. This modelling may use, at the least, the characteristics of the injection water and the characteristics of the first carbonate rock layer 4 to generate the first data.

In step 80, the processing system 52 additionally generates first flow characteristics of the sulfate enriched aqueous displacement fluid. These first flow characteristics may be generated by modelling the flow of the sulfate enriched aqueous displacement fluid through the first carbonate rock layer 4. To do this, the model may use, at the least, the water permeabilities of the first carbonate rock layer 4. An example of the flow of the sulfate enriched aqueous displacement fluid is shown by arrow A in FIG. 1.

In step 82, the computing system generates second flow characteristics of the sulfate enriched aqueous displacement fluid. These second flow characteristics may be generated by modelling the flow of the sulfate enriched aqueous displacement fluid from the first carbonate rock layer 4 into and through second carbonate rock layers 2 and 6 using, at the least, the water permeabilities of the carbonate rock layers, the water permeabilities of the interfaces between the layers, and the first flow characteristics generated in step 80. Such flow is shown by arrows B and F and C and D in FIG. 1.

Preferably, steps 80 and 82 and optionally step 78 may be performed simultaneously thereby allowing interactions between these modelling steps.

Having generated the first data in step 78, and the second flow characteristics in step 82, the processing system 52 generates second data indicative of a predicted amount of oil that will be displaced from the second carbonate rock layers 2 and 6 by the sulfate enriched aqueous displacement fluid (formed in the first carbonate rock layer 4) should the crude oil displacement system be configured to inject the injection water into the first carbonate rock layer 4.

Having generated the second data, the processing system 52 may then determine control data in step 86. However, the processing system 52 may, in step 88, modify one or more of the characteristics of the injection water used to generate the first data. Having modified the characteristics of the injection water, the processing system may then repeat steps 78 to 84, generating second data based on the modified characteristics of the injection water. This process may be iteratively repeated to attempt to identify the characteristics of the injection water which provide the most desired result, for example, a high amount of recovered oil.

Finally, in step 86, and on the basis of the second data, the processing system 52 determines control data indicative of one or more operating modes of the crude oil displacement system. The control data may comprise data indicative of: an instruction to inject the injection water into at least one of the first carbonate rock layers 4; an instruction not to inject the injection water into at least one of the first carbonate rock layers 4; an instruction to inject the injection water into at least one of the second carbonate rock layers 2 and 6; an instruction not to inject the injection water into at least one of the second carbonate rock layers 2 and 6; an instruction to inject a relatively high amount of injection water into at least one of the one or more first carbonate rock layers (i.e. an instruction to inject the injection water into the one or more first carbonate rock layers at a relatively high injection rate) and a relatively low amount of injection water into at least one of the one or more second carbonate rock layers (i.e. an instruction to inject the injection water into the one or more second carbonate rock layers at a relatively low injection rate); a completion arrangement for an injection well; and combinations of these instructions. This determination of operating mode may be done by comparing the second data to data indicative of volumes of oil that are capable of being displaced from the second carbonate rock layers 2 and 6 by displacement fluids having different chemical characteristics to the sulfate enriched aqueous displacement fluid formed in the first carbonate rock layer 4. In some embodiments, the first flow characteristics, that is the flow of the sulfate enriched aqueous displacement fluid through the first carbonate rock layer, may also be used in determining the control data.

Where the control data comprises data indicative of a completion arrangement for an injection well, the control data may identify a position for one or more packers, where, between the packers water is to be injected, locations for perforations on the casing of the injection well, an optimal position for a sliding sleeve, and other factors which will enable the one or more operating modes of the crude oil displacement system to be put into effect.

The determined operating mode, the determined completion mode or instructions based on the same may be outputted from the processing system 52 (e.g. via interfaces 62 and 64).

In the above embodiments, the characteristics of the injection water may include one or more of the concentration of multivalent cation components, the concentration of sulfate anions, the total dissolved solids (TDS) content of the injection water, and the temperature of the injection water. Preferably, the concentration of the multivalent cation components of the injection water includes the total multivalent cation concentration and the concentrations of one or more of the individual multivalent cations.

The characteristics of the crude oil may include one or more of the API gravity, the total acid number (TAN) value, the total base number (TBN) value of the oil and the concentration of the asphaltene and resin components of the oil.

Where the input data is indicative of characteristics of resident water within the carbonate rock layers 2, 4 and 6, this data may be used in the modelling of the dissolution of water-soluble sulfate minerals from the first carbonate rock layer 4 into the injection water in step 78. The characteristics of the resident water may be used to improve the modelling of the dissolution of the water-soluble sulfate minerals in the injection water as this enables the dispersive mixing of the resulting sulfate enriched aqueous displacement fluid with the resident water to be modelled (typically, this occurs at the front of the sulfate enriched aqueous displacement fluid as the fluid moves through the carbonate rock layers 2, 4 and 6).

The input data may also be indicative of rates of adsorption of sulfate anions onto the surface of the carbonate rock layers and rates of desorption of sulfate anions from the rock surfaces. The rates of adsorption and desorption of sulfate anions onto different types of carbonate rock surfaces may be determined from laboratory experiments using techniques well known to the person skilled in the art. Adsorption and desorption data may be used in conjunction with the modelling of the dissolution of water-soluble minerals from the first carbonate rock layer 4 into the injection water to determine the concentration of sulfate anions in the aqueous displacement fluid as it flows through the carbonate rock layer 4 and from carbonate rock layer 4 into and through carbonate rock layers 2 and 6.

Furthermore, where the input data is indicative of characteristics of the crude oil within the carbonate rock layers, this data may be used to generate the second data in step 84.

While the above has been described for a simplified crude oil recovery system comprising only three carbonate rock layers, embodiments are envisaged operating for reservoirs having any number of carbonate rock layers, including one or more first carbonate rock layers and one or more second carbonate rock layers. In some embodiments, a given first carbonate rock layer may be adjacent to two second carbonate rock layers (i.e. the first carbonate rock layer is sandwiched between the two second carbonate rock layers) as shown in FIG. 1. Appropriate first and second carbonate rock layers can be identified by the relative water-soluble sulfate mineral contents of the carbonate rock layers, and that a given second carbonate rock layer is adjacent to at least one first carbonate rock layer.

In some embodiments, the process described above in FIG. 4 may be repeated for different combinations of first and second carbonate rock layers. To do this, the processing system 52 may operate the predictive model to generate second data indicative of a predicted amount of oil that will be displaced responsive to configuring the crude oil displacement system so as to inject the injection water into a plurality of different subsets of the one or more first carbonate rock layers. These identified layers may be then used to determine the operating mode for the system. For example, the processing system 52 may generate second data for various scenarios where injection water is injected into different single first carbonate rock layers, for combinations of multiple first carbonate rock layers, and for all first carbonate rock layers. Subsequently, the computing system may identify, on the basis of second data generated for each of the subsets of the first carbonate rock layers, one or more carbonate rock layers into which to inject the injection water, this being used to determine the one or more operating modes of the crude oil displacement system in step 86. This process may be repeated iteratively, with a goal of, for example, maximising the amount of crude oil recovered.

Embodiments are also applicable to crude oil displacement systems arranged to inject injection water into one or more first carbonate rock layers of a reservoir through a plurality of injection wells and to recover crude oil from at least one, preferably, a plurality of production wells. As such the processing system 52 may operate the predictive model to generate second data indicative of a predicted amount of oil that will be displaced responsive to configuring the crude oil displacement system so as to inject the injection water into one or more first carbonate rock layers of the reservoir from different combinations of the plurality of injection wells. Subsequently, the processing system 52 may identify, on the basis of second data generated for each of the combination of injection wells, one or more injections wells from which to inject the injection water into the reservoir, this being used to determine the one or more operating modes of the crude oil displacement system in step 86. As before, this process may also be performed iteratively, with a goal of, for example, maximising the amount of crude oil recovered from the reservoir.

Different injection waters, having different characteristics, may be used by the crude oil displacement system. Accordingly, the processing system 52 may operate the predictive model for different injection waters having different characteristics. Subsequently, the processing system 52 may identify a desired injection water on the basis of the second data, this being used to determine the one or more operating modes of the crude oil displacement system in step 86. An iterative process may be used to fine tune the characteristics of the injection water.

As well as modelling the recovery of oil from the second layers, the predicative model may be used to model the recovery of oil from one or more of the first carbonate rock layers. Accordingly, the processing system 52 may model, using at least the first data generated in step 78 and data indicative of the water permeabilities of the carbonate rock layers, third data indicative of a predicted amount of oil that will be displaced from the first carbonate rock layers by the sulfate enriched aqueous displacement fluid formed in the first carbonate rock layers responsive to configuring the crude oil displacement system so as to inject the injection water into the at least one first carbonate rock layers. The combined predicted amount of oil which would be displaced from all of the first and second layers may then be used to determine the operating mode.

Embodiments of the invention are also applicable to planning the placement or arrangement of wells in a reservoir. For example, the predictive model may be run under the assumption that a well exists in a specific location prior to drilling and completing that well. Consequently, the processing system 52 may operate the predictive model so as to determine one or more locations for: one or more injection wells; and, one or more production wells. The predictive model may include input data relating to flow characteristics between an existing injection well and an existing production well and this input data may be used to determine one or more locations for additional injection and production wells.

Embodiments of the invention are also applicable to planning completion of the wells in a reservoir. For example, the processing system 52 may operate the predictive model so as to determine one or more completion modes for the injection wells that allow preferential injection of water into a first carbonate rock layer compared with a second carbonate rock layer, or allow injection of water into a first carbonate rock layer but not into a second carbonate rock layer.

In the above description, the operating modes were described as including an instruction to inject the injection water into the first carbonate rock layer 4; an instruction not to inject the injection water into the first carbonate rock layer 4; an instruction to inject the injection water into the second carbonate rock layers 2 and 6; and/or an instruction not to inject the injection water into the second carbonate rock layers 2 and 6. The operating modes were also described as including an instruction to inject the injection water into the first carbonate rock layer 4 at a relatively high injection rate and an instruction to injection the injection water into the second carbonate rock layers 2 and 6 at a relatively low injection rate such that the injection water may be preferentially injected into the first carbonate rock layer 4. It will be appreciated that depending on the complexity of the crude oil recovery system 1, the operating mode, and corresponding instructions, may be more complex. For instance, the operating mode may be for the crude oil recovery system 1 to inject injection water into a subset of all first carbonate rock layers in the reservoir, and optionally into a subset of all second carbonate rock layers. The operating mode may also be for the crude oil recovery system to inject the injection water at a relatively high injection rate into a subset of all first carbonate rock layers in the reservoir and at a relatively low injection rate into a subset of all second carbonate rock layers in the reservoir. The operating mode may optionally include an instruction to inject injection water from a subset of the injection wells which form the crude oil recovery system 1. In some embodiments, the injection water, that is the characteristics of the fluid to be used, may be optimized using the predictive model, (that is, as described above, may be selected from the generated second data based on the modified characteristics of the injection water), and optionally may be different for different injection wells.

Different steps of the above described embodiments may be performed by different components within the IMD software components. For example, a first component may be used to model the reservoir, and enable the identification of the first and second layers. A second component may be used to model the flow within the reservoir, using the model of the reservoir outputted from the first component. A further, third, component may be used to model the dissolution of the water-soluble sulfate mineral in the injection water based on the model of the reservoir outputted from the first component, and the flow of fluid within the reservoir outputted by the second component. A further component may be used to provide overall control, for example, providing input data to the components and receiving the output therefrom, and selecting the operating mode based on these outputs. In embodiments, different components may be executed on different computing systems, that is a first computing system may execute the first component, a second computing system, the second, etc.

Further Details of Exemplary Embodiments

Some specific details of exemplary embodiments will now be described.

The reservoir rock, through which the sulfate enriched aqueous displacement fluid passes, may comprise layers of carbonate rock with which the oil and, typically, resident water are associated, whether by inclusion in pores or between grains or otherwise. Carbonate rocks are a class of sedimentary rocks composed primarily of carbonate minerals such as calcite, aragonite, dolomite or mixtures thereof. The two major types of carbonate minerals are limestone, which comprises calcite, aragonite or mixtures thereof (different crystal forms of $CaCO_3$) and dolostone, which comprises the mineral dolomite ($CaMg(CO_3)_2$).

The layers of carbonate rock may also comprise other minerals such as water-soluble sulfate minerals, and the amount of water-soluble sulfate minerals may vary significantly between different layers of the reservoir rock. Water-soluble sulfate minerals are deposited when carbonate rocks are formed in evaporite (also referred to as Sabkha) depositional environments. Water-soluble sulfate minerals that may be found within carbonate rock layers include anhydrite ($CaSO_4$), hanksite ($Na_{22}K(SO_4)_9(CO_3)_2Cl$), gypsum ($CaSO_4.2H_2O$), chalcanthite ($CuSO_4.5H_2O$), kieserite ($MgSO_4.H_2O$), starkeyite ($MgSO_4.4H_2O$), hexahydrite ($MgSO_4.6H_2O$), epsomite ($MgSO_4.7H_2O$), meridianiite ($MgSO_4.11H_2O$), and melanterite ($FeSO_4.7H_2O$). The most common water-soluble sulfate minerals that occur within carbonate rock layers are anhydrite, gypsum and kieserite, in particular, anhydrite. As would be well known to the person skilled in the art, water-soluble sulfate minerals typically deposit in the pore space of the carbonate rock such that the permeability of the reservoir rock to water decreases with increasing levels of deposits of water-soluble sulfate minerals. Minor amounts of other minerals may also be present in the carbonate rock, including water-insoluble sulfate minerals such as barite ($BaSO_4$) and celestite ($SrSO_4$).

Stylolites may sometimes be found at the interfaces between carbonate rock layers of a reservoir. Stylolites form where soluble minerals have been removed by a process of pressure dissolution and insoluble minerals such as clays, iron pyrite, and metal oxides have become concentrated. Typically, stylolites at the interfaces between carbonate rock layers have a depth of 0.5 to 2 cm and owing to the nature of the accumulated minerals reduce the water permeability of the interface between the layers of carbonate rocks such that an injected water may be substantially prevented from passing between adjacent layers of carbonate rocks through the stylolites. In some cases, an effectively impermeable stylolite barrier may form. Such a barrier may comprise either a continuous stylolite contact surface or a discontinuous stylolite contact surface having discontinuities occupying less than 5% of the contact surface between the carbonate rock layers such that the stylolite contact surface may be regarded as being effectively impermeable.

The amount of water-soluble sulfate minerals in one or more of the carbonate rock layers of the reservoir rock may be determined by mineralogical analysis of the reservoir rock, for example, by X-ray diffraction analysis using ground-up reservoir rock. Typically, the ground-up samples of the layer(s) of reservoir rock are taken from a core removed from the reservoir. In addition, logging of the reservoir rock via one or more wells that penetrate the reservoir including injection wells, production wells, exploration wells, and surveillance wells may be used to further characterize the rock layers of the reservoir. For example, the layers of the reservoir rock may be characterized using logging techniques such as nuclear magnetic resonance (NMR) logging, resistivity logging or gamma ray logging. The data obtained using one or more of these logging techniques may be correlated with the mineralogical results obtained from analysing the layers of a core sample taken from the reservoir thereby providing a geological model of the reservoir that incorporates chemical characteristics of the layers of carbonate rock. The presence of effectively impermeable stylolite contact surfaces at the interfaces between carbonate rock layers may be determined using methods known to the person skilled in the art such as pressure interference testing. The geological model of the reservoir may therefore be incorporated into the predictive model and may be used to identify one or more intervals of the reservoir having effectively impermeable stylolite contact surfaces that would hinder or prevent the sulfate enriched aqueous displacement fluid formed in the first carbonate rock layer(s) from passing (permeating) into an adjacent second carbonate rock layer(s). In such situations, a decision may be taken not to preferentially inject the injection water into the first carbonate rock layers of such intervals.

The predictive model that incorporates the geological model of the reservoir may also be used to identify one or more intervals of the reservoir without effectively impermeable stylolite contact surfaces at the interfaces between carbonate rock layers such that a decision may be taken to preferentially inject the injection water into one or more first carbonate rock layers of such interval(s) with the sulfate enriched aqueous displacement fluid formed in the first carbonate rock layer(s) passing into an adjacent second carbonate rock layer(s), or, if there are no suitable intervals, to use an alternative recovery technique.

The oil-bearing reservoir may take the form of a plurality of first carbonate rock layers interbedded with a plurality of second carbonate rock layers. Preferably, the first carbonate rock layers are distributed in the reservoir such that at least one first carbonate rock layer is embedded (sandwiched) between second carbonate rock layers. Typically, the reservoir comprises a plurality of first carbonate rock layers embedded between second carbonate rock layers.

The first carbonate rock layer(s) of the reservoir may have a content of water-soluble sulfate minerals of at least 5% by weight, preferably, at least 7.5% by weight, in particular, at least 10% by weight. Typically, the first carbonate rock layer(s) has a content of water-soluble sulfate minerals of less than 25% by weight, and preferably, less than 20% by weight. The upper limit for the content of the sulfate minerals in the first carbonate rock layer(s) is typically dependent upon the permeability to water of the first carbonate rock layer(s) Thus, the sulfate mineral content of the first carbonate rock layer(s) should not be so high as to reduce its permeability to water to such as an extent that the injected water passes from the first carbonate rock layer into an adjacent second carbonate rock layer without any significant increase in its sulfate concentration.

The second carbonate rock layer(s) may have a content of water-soluble sulfate minerals of less than 5%, preferably, less than 2.5% by weight, in particular, less than 1% by weight.

The first and second carbonate rock layers may be termed "sulfate mineral-rich" and "sulfate mineral-poor" respectively.

Within any one carbonate rock layer of the reservoir, the horizontal permeability to water is typically the same as the vertical permeability to water. Accordingly, in the absence of significant quantities of stylolite at the interfaces between layers, the sulfate enriched aqueous displacement fluid has a tendency to migrate from the first (sulfate mineral-rich) carbonate rock layer(s) into adjacent second (sulfate mineral-poor) carbonate rock layers owing to the second carbonate rock layer(s) being of higher permeability to water than the first carbonate rock layer(s). For avoidance of doubt, the sulfate enriched aqueous displacement fluid that is formed within the first carbonate rock layer(s) may migrate upwardly or downwardly, that is, vertically, into either an overlying or underlying adjacent second carbonate rock layer(s) of the reservoir.

Embodiments of the method of the present invention may be used in a reservoir having a ratio of the water permeabilities of the second carbonate rock layer(s) to the first carbonate rock layer(s) of at least 1:1, preferably in the range of 1.1:1 to 10:1, more preferably 1.2:1 to 5:1. most preferably, 1.2:1 to 2:1, in particular, 1.2:1 to 1.75:1. Thus, in addition to sweeping at least part of the first carbonate rock layer(s) of the reservoir, a portion of the sulfate enriched aqueous displacement fluid passes (permeates) into and through the adjacent second carbonate rock layer(s) of the reservoir. Embodiments of the method of the present invention may therefore be regarded as waterflooding the second carbonate rock layer(s) through the first carbonate rock layer(s).

The water permeabilities of the carbonate rock layers may be determined using core plugs taken from a core removed from the reservoir using techniques well known to the person skilled in the art. The water permeabilities may be determined with the core plugs at 100% water saturation. Alternatively, the relative permeabilities of the core plugs to water may be determined at a given water saturation (with the remainder of the pore space of the core plugs occupied by hydrocarbon).

The permeability thickness of a carbonate rock layer may then be determined from the measured water permeability of the rock layer wherein permeability thickness, kh, of a rock layer is defined herein as the product of the water permeability, k, of the layer and its thickness. Where water is to be injected into a plurality of first carbonate rock layers, the permeability thickness of the first carbonate rock layers is the sum of the permeability thicknesses for each of the plurality of first carbonate rock layers.

Where the permeability thickness of the one or more first carbonate rock layers allows sufficient injection water to be injected into the first carbonate rock layer(s) for reservoir pressure maintenance and to achieve economic production rates, the completion of the injection well may prevent injection water from being directly injected into the one or more second carbonate rock layers. For example, the completion may include seals (packers) that isolate the one or more second carbonate rock layers from direct hydraulic communication with the injection well.

Where the permeability thickness of the one or more first carbonate rock layers does not allow sufficient injection water to be injected into the reservoir for reservoir pressure maintenance and to achieve economic production rates, it may be necessary to also inject the injection water into one or more second carbonate rock layers. The predictive model may therefore be used to determine the relative amounts of injection water to be injected into the one or more first carbonate rock layers and the one or more second carbonate rock layers in order to achieve optimal oil recovery whilst maintaining reservoir pressure and economic production rates. Where the injection water is to be injected into only a portion of the second carbonate rock layers for reservoir pressure maintenance and to achieve economic production rates, the predictive model may also be used to rank the second carbonate rock layers into which water is to be injected.

It is therefore envisaged that the completion of the injection well may allow a relatively high amount of the injection water to enter the one or more first carbonate rock layers and a relatively low amount of injection water (required for reservoir pressure maintenance and to achieve economic production rates) to enter the one or more of the second carbonate rock layers.

In contrast, the production well is typically in fluidic communication with substantially all of the oil-bearing carbonate rock layers of the reservoir irrespective of the sulfate mineral content of the carbonate rock. However, it is envisaged that one or more of the carbonate rock layers of the reservoir may be isolated from the production well in the event that the isolated layer(s) contains a high permeability channel that would result in the sulfate enriched aqueous displacement fluid by-passing oil present in the pore space of lower permeability rock layers of the reservoir.

It is preferred that the one or more second carbonate rock layers of the reservoir that are isolated from direct hydraulic communication with the injection well are relatively thick and are relatively few in number thereby reducing the complexity of the well completion. Preferably, the isolated interval(s) of the reservoir containing the second carbonate rock layer(s) has a thickness of at least 1 metre, preferably, a thickness in the range of 1 to 3 metres, for example, 2 to 3 metres.

In the event that there are one or more relatively thin first carbonate rock layers interbedded within relatively thick second layers, the isolated interval(s) of the reservoir may contain both the relatively thin first carbonate rock layer(s) and the relatively thick second carbonate rock layers. Accordingly, the person skilled in the art will understand that it is not essential to inject the aqueous displacement fluid into all of the first carbonate rock layers of the reservoir.

Conversely, where there are one or more relatively thin second carbonate rock layers interbedded within relatively thick first carbonate rock layers it may not be practical to isolate these relatively thin second carbonate rock layers from direct hydraulic communication with the injection well. Accordingly, the person skilled in the art will understand that the aqueous displacement fluid may be injected into both the relatively thin second carbonate rock layers and the relatively thick first carbonate rock layers.

By "relatively thin" is meant a carbonate rock layer having an average thickness of less than 1 metres, preferably, less than 0.5 metres in particular, less than 0.25 metres.

By "relatively thick" is meant a carbonate rock layer having an average thickness of at least 1 metres, preferably, at least 3 metres.

Where the one or more first carbonate rock layers, namely that or those in direct hydraulic communication with the injection well, contribute(s) at least 60% of the total permeability thickness of the reservoir interval penetrated by the injection well, the amount of water that may be injected into the first carbonate layer(s) is typically sufficient to maintain the reservoir pressure. The total permeability thickness of the reservoir interval penetrated by the injection well is defined herein as the sum of the permeability thicknesses for each of the individual layers of this reservoir interval.

Where there are a plurality of first carbonate rock layers in direct hydraulic communication with the injection well, the permeability thickness of the first carbonate rock layers is the sum of the permeability thicknesses for each of the plurality of first carbonate rock layers.

Where the one or more first carbonate rock layers that are in direct hydraulic communication with the injection well contributes less than 60% of the total permeability thickness of the reservoir, the amount of water that is injected into the first carbonate rock layer(s) may be insufficient to maintain the reservoir pressure. In the event that it is determined that the reservoir pressure cannot be maintained solely by injection of water into the one or more first carbonate rock layers of the reservoir, one or more second carbonate rock layers may also be in direct hydraulic communication with the injection well such that additional water may be injected directly into these layers from the injection well, as described above. The one or more second carbonate rock layers into which the additional water may be directly injected for reservoir pressure maintenance may be selected using the ranking obtained using the predictive model. This ranking may take into account factors such as the permeability thicknesses of the one or more second carbonate rock layers, the presence of any relatively thin first carbonate rock layers embedded within relatively thick second carbonate rock layers, and the water-soluble sulfate mineral content of the second carbonate rock layers.

It may also be possible to maintain reservoir pressure and economic production rates by drilling additional injection wells such that additional injection water may be injected into the first carbonate rock layers through these additional injection wells. This may reduce the amount of injection water required to be injected into the one or more second carbonate rock layers or may eliminate the requirement for injection of water into the second carbonate layer(s).

The sulfate-enriched aqueous displacement fluid that is formed within the one or more first carbonate rock layers of the reservoir and which flows (permeates) through the first carbonate rock layer(s) and from the first carbonate rock layer(s) into and through the adjacent second carbonate rock layer(s) displaces crude oil from the pores of the reservoir rock. Thus, a bank of oil is displaced by the sulfate enriched aqueous displacement fluid towards the production well from which the oil is recovered. The term "bank of oil" is well known to the person skilled in the art and refers to a portion of the reservoir where the oil saturation is increased because of application of an improved oil recovery method. Thus, an advantage of the embodiments of the method of the present invention is that incremental oil is recovered at the production well.

Percentage incremental oil production is defined herein as:

$$[(S_{or}-S_{or}^1)/(S_{oi}-S_{or})]\times 100\%$$

wherein $S_{or}$ is the residual oil saturation achieved with a high salinity aqueous displacement fluid having a similar composition to the resident water of the reservoir (that is, a water in which there would be minimal in situ dissolution of sulfate mineral), $S_{or}^1$ is the residual oil saturation achieved with the sulfate enriched aqueous displacement fluid, and $S_{oi}$ is the initial oil saturation. By similar composition to the resident water is meant a water having a TDS that is within ±5% of the TDS of the resident water and, preferably, a sulfate concentration similar to that of the resident water, for example, within ±5% of the sulfate concentration of the resident water.

Typically, the incremental oil production that can be achieved using the embodiments of the method of the present invention is at least 1%, preferably, in the range of 3% to 25%, for example, in the range of 3 to 15% above that achieved or predicted to be achieved when waterflooding the reservoir with a high salinity aqueous displacement fluid having a similar composition to the resident water of the reservoir, (that is, a water in which there is minimal in situ dissolution of water-soluble sulfate mineral).

The concentration of sulfate anions in the sulfate enriched aqueous displacement fluid may be determined by analysing water produced from a surveillance well or water that breaks through into the production well(s). It is also envisaged that the concentration of sulfate anions in the sulfate enriched aqueous displacement fluid may be determined from modelling studies based on one or more of the following input parameters:

the initial concentration of water-soluble sulfate mineral deposits that are present in the first carbonate rock layer(s);

the rate of depletion of water-soluble sulfate mineral deposits from the first carbonate rock layer(s);

the volume of carbonate rock in the first carbonate rock layer(s) which, in turn, is dependent on the porosity of the first carbonate rock layer(s), the total thickness of the layer(s);

the temperature dependent solubility equilibrium constant that exists for the various water-soluble sulfate mineral deposits when in chemical equilibrium with a solution of the sulfate mineral;

the variation in the solubility equilibrium constants for the various water-soluble sulfate minerals with pressure;

the volume of water injected into the first carbonate rock layer(s);

the rate of injection of the injection water into the first carbonate rock layer(s);

the sulfate anion concentration and total dissolved solids (TDS) content of the injection water relative to that of the resident water;

the temperature of the injection water;

the reservoir temperature;

the location of any thermal front within the reservoir (arising from cooling of the reservoir by any previously injected fluid or by the water injected using embodiments of the method of the present invention);

the ratio of the permeability to water of the second carbonate rock layer(s) and the permeability to water of the adjacent first carbonate rock layer(s) of the reservoir.

The person skilled in the art will understand that the amount of dissolution of water-soluble sulfate mineral in the injection water changes with temperature. The person skilled in the art will also understand that if the injected fluids (that is, any previously injected fluids and the injection water used in embodiments of the method of the present invention) are cooler than the reservoir temperature, there will be a temperature or thermal front at an increasing radial distance from the injection well. The modelling of the dissolution of water-soluble sulfate mineral takes into account the location of the thermal front in the reservoir.

Preferably, the injection water is injected into a reservoir having a reservoir temperature in the range of 70 to 300° C., for example, 70 to 200° C., in particular 100 to 150° C. Where there is a thermal front, the reservoir temperature refers to the temperature beyond the thermal front. Preferably, the temperature of the injection water should be sufficiently high to maintain a reservoir temperature of at least 70° C. If necessary, the injection water may be heated (for example, in a heat exchanger against a hot produced fluid) in order to ensure that the reservoir temperature does not fall below a value of 70° C.

Where an embodiment of the method of the present invention is used in tertiary recovery mode and the reservoir has previously been cooled to a temperature in the range of 65° C. to less than 70° C., it may be possible to increase the temperature of the reservoir to a value of at least 70° C. by heating the injection water. Similarly, where an embodiment of the method of the present invention is used in secondary recovery mode (before injection of any other fluids into the reservoir) and the reservoir temperature is in the range of 65° C. to less than 70° C. it may be possible to increase the temperature of the reservoir to a value of at least 70° C. by heating the injection water. Preferably, the increase in temperature of the reservoir is achieved by heating the injection water to a temperature of at least 75° C., more preferably, at least 80° C., in particular, at least 90° C.

The amount of incremental oil recovery that may be achieved with embodiments of the method of the present invention is dependent upon the concentration of sulfate anions in the sulfate enriched aqueous displacement fluid relative to the sulfate concentration of the resident water contained within the pore space of the first carbonate layer(s) of the reservoir. Preferably, the sulfate enriched aqueous displacement fluid that is formed within the first carbonate rock layer(s) has a sulfate concentration at least 0.01 mol/l (960 ppmv) greater than, and preferably at least 0.1 mol/l (9600 ppmv) greater than, the sulfate concentration of the resident water present within the pore space of the first carbonate rock layer(s) of the reservoir. Here, "ppmv" means parts per million on a weight/volume of water basis. The person skilled in the art will understand that this unit is equivalent to the unit mg/l.

The upper limit for the sulfate concentration of the sulfate enriched aqueous displacement fluid is the concentration of sulfate that is in chemical equilibrium with the sulfate mineral deposits contained within the first carbonate rock layer(s) of the reservoir at the temperature and pressure of the reservoir.

The predictive model that is used to determine the one or more operating modes of the crude oil displacement system (or the one or more modes for completing the injection well(s)) may be validated from coreflood experiments performed on core plugs taken from the carbonate rock layers of the reservoir.

The person skilled in the art will understand that the coreflood experiments may be performed by injecting a synthetic sulfate enriched aqueous displacement fluid, having a composition determined using the predictive model, into a core sample taken from a second (sulfate-mineral poor) carbonate rock layer of the reservoir wherein the core sample is at initial oil saturation ($S_{oi}$). Alternatively, a first and second core sample (both at $S_{oi}$) may be arranged in series wherein the first core sample is taken from a first (sulfate mineral-rich) carbonate rock layer and the second core sample is taken from a second (sulfate mineral-poor) carbonate rock layer. An injection water having specified characteristics may be injected into the first core sample and the fluids removed from the first core sample (produced oil and produced water that is enriched in sulfate) are separated and the separated produced water is subsequently injected into the second core sample in the series. Alternatively, a first coreflood experiment may be performed with a first core sample taken from a first (sulfate mineral-rich) carbonate rock layer and an injection water having specified characteristics is injected into the first core sample, and the produced water removed from the first core sample is analysed for dissolved solids (TDS and concentrations of individual ions). A second coreflood experiment may be performed with a second core sample taken from a second (sulfate mineral-poor) layer and a synthetic sulfate enriched aqueous displacement fluid having the same composition of dissolved solids as the analysed produced water is injected into the second core sample. Thus, the measured residual oil saturations (and hence the oil recoveries) achieved in these coreflood tests may be compared with the predicted amounts of oil determined using the predictive model.

The predictive model may also be validated from a first and second single well chemical tracer (SWCT) test carried out on a well that penetrates the first and second carbonate rock layers of the reservoir. A SWCT test is designed to measure the in-situ oil saturation (residual oil saturation) in a reservoir. The first SWCT test employs an injection water having specified characteristics (first injection fluid) while the second SWCT test employs a synthetic sulfate enriched aqueous displacement fluid (second injection fluid). In both tests, the injection fluid (injection water or synthetic sulfate enriched aqueous displacement fluid) is divided into a first (minor) portion and a second (major) portion wherein the first portion is injected immediately before the second portion of the injection fluid. The first portion of the injection fluid is labelled with a reactive chemical tracer, for example, an ester such as ethyl acetate, that reacts with water during a shut-in period to form a product tracer (for example, an alcohol such as ethanol) that is virtually insoluble in the oil phase that is present in the pore space of the reservoir. Optionally, the first and second portions of the injection fluid are labelled with a non-reactive, non-partitioning (material balance) tracer, for example, isopropanol. The amount of the second portion of injection fluid is typically sufficient to push the first portion of the injection fluid to a radial distance of at least 5 feet, for example, between 5 to 15 feet from the wellbore. Typically, the well is shut-in for a period of from one to ten days to allow a detectable (measurable) amount of a product tracer to form. Typically, the conversion of the reactive tracer to the product tracer (for example, ester to alcohol conversion) is from 10 to 50%. After, the shut-in period, the well is back-produced and the produced fluid is periodically sampled and analysed, preferably, immediately, for the content of unreacted reactive tracer (e.g. ethyl acetate), the product tracer (e.g. ethanol) and the optional material balance tracer (e.g. isopropanol). Prior to the start of the back-production step, the unreacted reactive tracer and the product tracer are superimposed within the first portion of the injected fluid. During the back-production step, partitioning of the unreacted reactive tracer between the immobile residual oil phase and the mobile water phase delays production of the unreacted reactive tracer by an increment of volume directly related to the residual oil saturation. However, the product tracer does not partition between the immobile residual oil phase and the mobile water phase such that its production is not delayed. The product tracer therefore flows back to the well at very nearly the same rate as the water and is therefore produced earlier than the unreacted reactive tracer, resulting in a separation between the peak concentrations of the product tracer and unreacted reactive tracer. The residual oil saturation is then calculated using the amount of separation between the peak concentrations of the product tracer and unreacted reactive tracer. Thus, a SWCT test for a layer of carbonate rock having a high residual oil saturation shows a large separation between the product tracer and the unreacted reactive tracer while a test for a layer of carbonate rock having low residual oil saturations shows a small separation between the product tracer and the unreacted reactive tracer. The optional material balance tracer allows for interpretation of the test results in the event that all of the reactive tracer reacts, or if some of the unreacted reactive tracer is stripped away from the produced aqueous fluid by gas breaking out of the fluid or by gas used during gas-lift operations. SWCT tests are described in more detail in, for example, Deans, H. A., and Carlisle, C. T.: "Single-Well Tracer Tests in Complex Pore Systems", paper SPE/DOE 14886, presented at the Fifth Symposium on EOR Tulsa, Apr. 20_23, 1986).

During the first SWCT test, the first and second portions of the first injection fluid (water having specified characteristics) are injected into at least one first (sulfate mineral-rich) carbonate rock layer of the reservoir. The well is then placed on back-production such that fluids are back-produced from this first (sulfate mineral-rich) carbonate rock layer. The water that is back-produced from the at least one first (sulfate mineral-rich) carbonate rock layer is then analysed for dissolved solids. During this first SWCT test, the second (sulfate mineral-poor) rock layer(s) of the reservoir are not in direct hydraulic communication with the injection well. A second SWCT test is then carried out using the second injection fluid which is a synthetic sulfate enriched aqueous displacement fluid having the same composition of dissolved solids as the water back-produced during the first SWCT test. The first and second portions of the second injection fluid are injected into at least one second (sulfate mineral-poor) rock layer of the reservoir. The well is then put on back-production such that fluids are back-produced from the second (sulfate mineral-poor) rock layer(s). During this second SWCT test, the first (sulfate mineral-rich) rock layer(s) are not in direct hydraulic communication with the injection well. Thus, the measured residual oil saturations (and hence the oil recoveries) achieved in these SWCT tests may be compared with the predicted amounts of oil, determined using the predictive model.

It is desirable that the sulfate-enriched aqueous displacement fluid sweeps a high proportion of the pore volume of the carbonate rock layers of the reservoir. It is therefore desirable that the concentration of dissolved sulfate anions in the sulfate enriched aqueous displacement fluid reaches chemical equilibrium with the water-soluble sulfate mineral deposits contained within the first carbonate rock layer(s) as close to the injection well as possible, for example, at less than 20%, preferably less than 10% of the interwell distance between the injection well and production well.

The amount of water-soluble sulfate mineral that dissolves in the water injected into the first carbonate rock layer(s) is dependent on its water-soluble sulfate mineral content. Thus, when the injection water is injected into two or more first carbonate rock layers, the sulfate concentration of the sulfate enriched aqueous displacement fluids formed in the two or more first carbonate rock layers may differ owing to differences in the water-soluble sulfate mineral content of the layers.

The amount of water-soluble sulfate mineral that dissolves in the water injected into the first carbonate rock layer(s) is also dependent on the sulfate concentration and total dissolved solids (TDS) content of the injected water. The person skilled in the art will understand that the concentration of sulfate in the sulfate enriched aqueous displacement fluid may increase with decreasing salinity (TDS) of the injected water. Accordingly, it is preferred that the injection water has a TDS content that is at least 20,000 ppmv lower than that of the resident water. Where the resident water has a TDS content of at least 50,000 ppmv, preferably, at least 75,000 ppmv, for example, at least 100,000 ppmv, a relatively high salinity water such as seawater, certain produced waters or mixtures thereof may be used as the injection water. By "produced water" is meant a water separated from a produced hydrocarbon at a hydrocarbon production and separation facility. Preferably, the relatively high salinity injection water (for example, seawater, a high salinity produced water, or mixtures thereof) has a TDS in the range of 20,000 to 50,000 ppmv, in particular, 20,000 to 40,000 ppmv, with the proviso that the TDS of the injection water is at least 20,000 ppmv lower than that of the resident water.

However, it is preferred to employ a low salinity water as the injection water. By low salinity water is meant a water having a TDS content of less than 20,000 ppmv, preferably, less than 15,000 ppmv, in particular, less than 10,000 ppmv. Preferably, the low salinity water has a TDS content in the range of 200 to 10,000 ppmv, more preferably 500 ppm to 10,000 ppmv, most preferably 500 to 7,500 ppmv, in particular, 500 to 5,000 ppmv.

The low salinity injection water may be a fresh water or a brackish water. Fresh water may be obtained from a river, lake or an aquifer and typically has a TDS content of less than 1,500 ppm. Brackish water may be obtained from an estuarine river source, an inland sea or an aquifer. In addition, certain produced waters may be of sufficiently low salinity that they may be employed as the low salinity injection water.

Alternatively, the low salinity injection water may be a desalinated water produced by a desalination plant, in particular, a desalination plant that employs a membrane desalination process such as reverse osmosis or forward osmosis (also referred to in the art as "direct osmosis") process. Waters that may be used as feed to a membrane desalination plant include seawater, brackish waters (for example, estuarine, aquifer or produced waters), saline aquifer waters, saline produced waters or mixtures thereof. The use of produced water as a feed to the desalination plant is advantageous where there are restrictions on disposal of produced water. Seawater is also a preferred feed water for a desalination plant, whether inland seas of 15,000 to 40,000 ppmv TDS, or oceanic seas, for example, of 30,000 to 45,000 ppmv TDS.

Preferably, the reverse osmosis or forward osmosis desalination plant employs a membrane that excludes substantially all of the dissolved solids in the feed water from passing into the treated water (permeate). Suitable membranes that exclude substantially all of the dissolved solids are well known to the person skilled in the art. Accordingly, the treated water may have a TDS of as low as 200 ppmv.

The amount of water that is injected into a reservoir is normally expressed in terms of the "pore volume" or PV.

The term "total pore volume" is used herein to mean the "swept pore volume" between an injection well and a production well. The "swept pore volume" is the pore volume swept by the sulfate enriched aqueous displacement fluid averaged over all flow paths between an injection well and production well. The person skilled in the art will understand that the swept pore volume includes flow paths where the sulfate enriched aqueous displacement fluid passes into one or more second carbonate rock layers of the reservoir that are not in direct hydraulic communication with the injection well as well as flow paths where the sulfate enriched aqueous displacement fluid continues to flow (permeate) through one or more first carbonate rock layers of the reservoir. Where an injection well has two or more associated production wells, the term "total pore volume" means the swept pore volume between the injection well and the two or more production wells.

The term "pore volume of the first carbonate rock layer(s)" is used herein to mean the pore volume swept by the sulfate enriched aqueous displacement fluid averaged over all flow paths through the first carbonate rock layer(s). The term "pore volume of the second carbonate rock layer(s)" is used herein to mean the pore volume swept by the sulfate enriched aqueous displacement fluid averaged over all flow paths through the second carbonate rock layer(s).

The "total pore volume", the "pore volume of the first carbonate rock layer(s)" and the "pore volume of the second carbonate rock layer(s)" between an injection well and its associated production well(s) may be readily determined by methods known to the person skilled in the art such as modelling studies. These modelling studies employ a reservoir simulator into which has been imported a static geological model of the reservoir. This static geological model is obtained by inputting seismic imaging data and petrophysical data including the porosity and permeability of the reservoir rock, mineralogical data, permeability thicknesses of the first (sulfate-mineral rich) and second (sulfate-mineral poor) carbonate rock layers, the relative pore volumes of the first (sulfate-mineral rich) and second (sulfate-mineral poor) carbonate rock layers, the initial water saturation of the reservoir, and the initial oil saturation of the reservoir, thereby generating a 3 dimensional (3-D) model of the reservoir showing the layers of the reservoir rock, traps and any faults and incorporating the petrophysical data associated with one or more layers of the reservoir. The locations of the injection well(s) and production well(s) are subsequently inputted into the reservoir simulator together with additional fluid properties such as the relative permeabilities of the reservoir rock to oil and water for the various carbonate rock layers of the reservoir. The reservoir simulator may then be used to model injection of fluids into the reservoir via the injection well(s), movement of fluids through one or more layers of the reservoir, in particular, the oil-bearing carbonate rock layers, and production of fluids from the reservoir via the production well(s). The reservoir simulator model may also be updated using 4-dimensional (4-D) seismic imaging data i.e. seismic imaging data obtained at one or more points in time following commencement of oil production from the reservoir. The reservoir simulator may be used to determine the total swept pore volume, the swept pore volume of the first (sulfate mineral-rich) carbonate rock layer(s), and the swept pore volume of the second (sulfate mineral-poor) carbonate rock layer(s) between one or more injection wells and one or more production wells by modelling the movement of an injected fluid comprising a tracer from the injection well(s) to the production well(s). The total swept pore volume, the swept pore volume of the first (sulfate mineral-rich) carbonate rock layer(s) and the swept pore volume of the second (sulfate mineral-poor) carbonate rock layer(s) take into account barriers to flow such as a reduction in permeability of the reservoir rock or the presence of impermeable stylolite barriers at the boundary surfaces between the carbonate rock layers of the reservoir.

Where the injection water is a relatively high salinity water (as defined above), the injection water may be readily available and may be continuously injected into the first carbonate rock layers of the reservoir. However, where the injection water is a low salinity water (as defined above), it may be desirable to minimise the pore volume of low salinity water as there may be a limited injection capacity for the low salinity water owing to the need to (i) dispose of a higher salinity produced water or (ii) a limited supply of the low salinity water (for example, owing to a limited production capacity of a desalination plant).

It is preferred that the amount of sulfate enriched aqueous displacement fluid that passes from the one or more first carbonate rock layers into and through the adjacent second carbonate rock layer(s) has a pore volume of at least 0.2 (based on the total swept pore volume of second carbonate layer(s)). This is because a lower pore volume of the sulfate enriched aqueous displacement fluid would tend to dissipate in the second carbonate rock layer(s) of the reservoir owing to diffusive mixing with the resident water and adsorption of sulfate anions onto the rock surface. Accordingly, a low pore volume of sulfate enriched aqueous displacement fluid of less than 0.2 may not result in appreciable incremental oil production. Depending on the sulfate concentration of the sulfate enriched aqueous displacement fluid and the rate of adsorption of sulfate onto the carbonate rock of the second layer(s), a pore volume may be determined for the sulfate enriched aqueous displacement fluid (using the predictive model) that tends to maintain its integrity (that is, does not disperse) within the second (sulfate-mineral poor) carbonate rock layer(s) of the reservoir, and therefore continues to sweep displaced oil through the second carbonate rock layer(s) towards a production well. Preferably, the pore volume of the sulfate enriched aqueous displacement fluid that passes into and through the second carbonate rock layer(s) is at least 0.3, preferably, at least 0.4, based on the total swept pore volume of the second carbonate layer(s). Preferably, the pore volume of sulfate enriched aqueous displacement fluid that passes into and through the second carbonate rock layer(s) is less than 2, more preferably, less than 1.5, in particular, less than 1 PV, based on the total swept pore volume of the second carbonate layer(s). Preferably, the pore volume of sulfate enriched aqueous displacement fluid that passes into and through the adjacent second carbonate rock layer(s) is in the range of 0.3 to 1.0 PV, preferably 0.4 to 0.9 PV, based on the total swept pore volume of the second carbonate rock layer(s). Such low pore volume amounts of sulfate enriched aqueous displacement fluid are referred to herein as "slugs". The amount of low salinity water injected into the first carbonate rock layer(s) to form a desired low pore volume slug of sulfate enriched aqueous displacement fluid within the second carbonate rock layer(s) decreases with increasing ratio of the water permeability of the adjacent second carbonate rock layer(s) to the water permeability of the first carbonate rock layer(s). This is because, as the permeability ratio increases, an increasing proportion of the injected water passes from the first carbonate rock layer(s) into the adjacent second carbonate rock layer(s) and, consequently, a decreasing proportion of the injected water continues to flow (permeate) through the first carbonate rock layer(s).

Preferably, the low salinity injection water is injected into the first carbonate rock layer(s) of the reservoir in an amount that results in a non-dispersive slug of sulfate enriched aqueous displacement fluid within both the first and second carbonate rock layer(s) of the reservoir. Preferably, the non-dispersive slug of sulfate enriched aqueous displacement fluid that passes through the first carbonate rock layer(s) has a pore volume of at least 0.3 and preferably, at least 0.4, based on the total swept pore volume of the first carbonate layer(s). However, where the ratio of the permeabilities to water of the adjacent second (sulfate mineral-poor) carbonate rock layer(s) to the first (sulfate mineral-rich) carbonate rock layer(s) is high (for example, is greater than 3:1, in particular, greater than 5:1) it may not be practical to inject sufficient low salinity water into the first carbonate rock layer(s) to create a non-dispersive slug of the sulfate enriched aqueous displacement fluid within both the first carbonate rock layer(s) and the second carbonate rock layer(s) due to either (i) a limited availability of a naturally occurring low salinity water, or (ii) a limited production capacity of a desalination plant.

After injection of an amount of the low salinity water that achieves close to the maximum incremental oil recovery from at least the second carbonate rock layer(s) and preferably from both the second and first carbonate rock layers, a drive (or post-flush) water of higher salinity (TDS content) may be injected into the first carbonate rock layer(s) thereby ensuring that the slug of sulfate enriched aqueous displacement fluid (and hence a bank of released oil) is swept through at least the second carbonate rock layer(s) and preferably through both the second and first carbonate rock layers of the reservoir to the production well. In addition, the injection of the drive water may be required to maintain the pressure in the reservoir. Typically, the drive water may be any readily available water such as seawater or a produced water. Where the drive water has a TDS that is at least 20,000 ppmv lower than that of the resident water present within the pore space of the first carbonate layer(s), and insufficient low salinity water was injected into the first carbonate rock layer(s) to achieve a non-dispersive slug of sulfate enriched aqueous displacement fluid within both the second and first carbonate rock layers, the drive water may dissolve further sulfate mineral deposits within the first carbonate rock layer(s) thereby resulting in incremental oil recovery from the first carbonate rock layer(s).

The drive water may be injected into all of the carbonate rock layers of the reservoir irrespective of the initial sulfate mineral content of these layers. Thus, packers or other equipment used to isolate the second carbonate rock layer(s) from the injection well may be removed prior to commencing injection of the drive water.

Where it is necessary to dispose of a high salinity produced water (for example, a produced water having a salinity and dissolved ion concentration, in particular, sulfate concentration, similar to that of the resident water present within the first carbonate layer(s) of the reservoir), by injection into one or more injection wells of the reservoir, a sulfate salt may be added to the produced water in order to achieve incremental oil recovery from zones of the reservoir that are swept by the produced water. Suitably, the sulfate concentration of the resulting sulfate enriched high salinity produced water is at least 1,000 ppmv higher, preferably, at least 5,000 ppmv higher than that of the produced water.

The oil which is associated with the reservoir rock may have an American Petroleum Institute (API) gravity of at least 15-60° preferably at least 30-45°, such as 20-30°. Without wishing to be bound by any theory, it is believed that higher incremental oil production is achieved using embodiments of the process of the present invention when the oil associated with the reservoir rock is relatively acidic. It is therefore preferred that the oil has a total acid number (TAN) value of at least 0.05 mg KOH/g.

In embodiments of the method of the invention, the injection water is preferably injected under pressure, for example, of 10,000 to 100,000 kPa (100 to 1000 bar) into at least one injection well that is spaced from at least one production well.

Embodiments of the method of the present invention are preferably used during secondary recovery which may occur at commencement of oil production from the reservoir (omitting primary recovery) or after primary recovery of oil under the natural pressure of the reservoir. Alternatively, embodiments of the method of the present invention may be used during tertiary recovery (for example, after a waterflood with a water having a salinity and dissolved ion composition, in particular, sulfate concentration, similar to that of the resident water of the reservoir).

The person skilled in the art will understand that during secondary recovery, a fluid is injected into the reservoir from an injection well in order to maintain the pressure in the reservoir and to sweep oil towards a production well. An advantage of employing embodiments of the method of the present invention during secondary recovery is that the sulfate enriched aqueous displacement fluid that passes into and through the second carbonate rock layer(s) releases additional oil from the pores of the second carbonate rock layer(s) and also from at least a portion of the first carbonate rock layer(s) of the reservoir. Accordingly, there may be a longer period of dry oil recovery from the production well thereby deferring water break-through. In addition, even after water break-through, there will be enhanced recovery of oil compared with using an injection water having a similar salinity and dissolved ion composition, in particular, sulfate concentration to the resident water of the first carbonate rock layer(s). Also, there may be less water production (a higher oil to water ratio) for a given volume of produced fluid compared with using an injection water having a similar salinity and dissolved ion composition, in particular, sulfate concentration to the resident water of the first carbonate rock layer(s). These advantages also apply if an embodiment of the method of the present invention is used at commencement of oil production from a reservoir.

The person skilled in the art will understand that during tertiary recovery, injection of the original fluid is stopped and a different fluid is injected into the reservoir for enhanced oil recovery. The fluid injected into the one or more first carbonate rock layers of the reservoir during tertiary recovery is preferably a low salinity water. It is preferred that the original fluid injected into the reservoir is a high salinity water that does not have a naturally high sulfate concentration (that is, its sulfate concentration is not significantly above that of the resident water present within the pore space of the first carbonate rock layer(s) as, otherwise, this may reduce the incremental oil recovery that may be achieved using embodiments of the method of the present invention during tertiary recovery.

There may be one injection well and one production well, but preferably there may be more than one injection well and more than one production well. There may be many different spatial relationships between the or each injection well and the or each production well. Injection wells may be located around a production well. Alternatively the injection wells may be in two or more rows between each of which are located production wells. These configurations are termed "pattern flood", and the person skilled in the art will know how to operate the injection wells to achieve maximum oil recovery during the water flood treatment (secondary or tertiary recovery). The person skilled in the art will understand that depending on the spatial arrangement of the injection well and its associated production wells, the sulfate-enriched aqueous displacement fluid that is formed within the first carbonate rock layer(s) and which passes into and through the adjacent second carbonate rock layer(s) may break-through into each production well at different times. Typically pattern floods are used on land while offshore there are typically fewer production wells and injection wells.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims. The features of the claims may be combined in combinations other than those specified in the claims.

The invention claimed is:

1. A computer-implemented method for determining one or more operating modes for a crude oil displacement system, the crude oil displacement system being arranged to inject an injection water into a reservoir, the reservoir comprising at least two carbonate rock layers having crude oil present within a pore space thereof, said crude oil displacement system being for use in displacing crude oil from the pore space of the carbonate rock layers, the method comprising the steps of:

receiving input data indicative of:
i) characteristics of the injection water, comprising temperature, salinity, and sulfate concentration; and
ii) characteristics of the carbonate rock layers comprising temperature, permeabilities of the carbonate rock layers, water-soluble sulfate mineral content of the carbonate rock layers, and an indication of permeabilities of one or more interfaces between adjacent ones of the carbonate rock layers;

inputting said input data into a computer-implemented predictive model;

operating the predictive model so as to:
a) identify one or more first carbonate rock layers and one or more second carbonate rock layers of the at least two carbonate rock layers, the one or more second carbonate rock layers being adjacent to at least one of the one or more first carbonate rock layers, the one or more first carbonate rock layers having a water-soluble sulfate mineral content and the one or more second carbonate rock layers having a water-soluble sulfate mineral content, wherein the water-soluble sulfate mineral content of the one or more first carbonate rock layers is greater than the water-soluble sulfate mineral content of the one or more second carbonate rock layers;

b) model, using at least the data indicative of the characteristics of the injection water and of the characteristics of the carbonate rock layers, dissolution of water-soluble sulfate minerals from at least one first carbonate rock layer of the one or more first carbonate rock layers into the injection water that will occur on configuring the crude oil displacement system to inject said injection water into the at least one first carbonate rock layer, whereby to generate first data representing chemical characteristics of a sulfate enriched aqueous displacement fluid formed in the at least one first carbonate rock layer by the dissolution of water-soluble sulfate minerals into the injection water;

c) model, using at least the data indicative of the permeabilities of the carbonate rock layers, flow of the sulfate enriched aqueous displacement fluid through the at least one first carbonate rock layer, whereby to generate first flow characteristics of the sulfate enriched aqueous displacement fluid;

d) model, using at least the data indicative of the permeabilities of the carbonate rock layers, the permeabilities of the one or more interfaces and the first flow characteristics, flow of the sulfate enriched aqueous displacement fluid from the at least one first carbonate rock layer into and through at least one second carbonate rock layer of the one or more second carbonate rock layers, whereby to generate second flow characteristics of the sulfate enriched aqueous displacement fluid; and e) generate, based on at least the first data and the modelled second flow characteristics, second data indicative of a predicted amount of oil that will be displaced from the at least one second carbonate rock layer by the sulfate enriched aqueous displacement fluid formed in the at least one first carbonate rock layer responsive to configuring the crude oil displacement system so as to inject the injection water into the at least one first carbonate rock layer; and determining, on the basis of the second data, control data indicative of one or more operating modes of the crude oil displacement system.

2. The method of claim 1, comprising comparing the second data to data indicative of one or more volumes of oil that are capable of being displaced from the one or more second carbonate rock layers by aqueous displacement fluids having different chemical characteristics to the sulfate enriched aqueous displacement fluid formed in the at least one first carbonate rock layer, whereby to determine said control data.

3. The method of claim 1, wherein the control data comprise data indicative of at least one of:
an instruction to inject the injection water into at least one of the one or more first carbonate rock layers;
an instruction not to inject the injection water into at least one of the one or more first carbonate rock layers;

an instruction to inject the injection water into at least one of the one or more second carbonate rock layers;

an instruction not to inject the injection water into at least one of the one or more second carbonate rock layers; and/or an instruction to inject an amount of injection water into at least one of the one or more first carbonate rock layers and an amount of injection water into at least one of the one or more second carbonate rock layers, wherein the amount of injection water to inject into at least one of the one or more first carbonate rock layers is greater than the amount of injection water to inject into at least one of the one or more second carbonate rock layers.

4. The method of claim 1, wherein the identifying of one or more first carbonate rock layers identifies a plurality of said first carbonate rock layers, and the method comprises:

operating the predictive model to generate second data indicative of a predicted amount of oil that will be displaced responsive to configuring the crude oil displacement system so as to inject the injection water into a plurality of different subsets of the identified plurality of first carbonate rock layers;

identifying, on the basis of second data generated for each of the subsets of first carbonate rock layers, one or more carbonate rock layers into which to inject the injection water, whereby to determine said one or more operating modes.

5. The method of claim 1, wherein the crude oil displacement system is arranged to inject an injection water into the reservoir through a plurality of injection wells, the method comprising:

operating the predictive model to generate second data indicative of a predicted amount of oil that will be displaced responsive to configuring the crude oil displacement system so as to inject the injection water into the reservoir from different combinations of the plurality of injection wells; and identifying, on the basis of second data generated for each of the subsets of injection wells, one or more injections wells from which to inject said injection water into the reservoir, whereby to determine said one or more operating modes.

6. The method of claim 1, further comprising the steps of:

operating the predictive model to generate second data indicative of a predicted amount of oil that will be displaced responsive to configuring the crude oil displacement system so as to inject different injection waters having different characteristics into the reservoir; and identifying a desired injection water on the basis of the second data, whereby to determine said one or more operating modes.

7. The method of claim 1, further comprising the step of operating the predictive model so as to:

model, using at least the first data and data indicative of the permeabilities of the carbonate rock layers, third data indicative of a predicted amount of oil that will be displaced from the at least one first carbonate rock layer by the sulfate enriched aqueous displacement fluid formed in the at least one first carbonate rock layer responsive to configuring the crude oil displacement system so as to inject the injection water into the at least one first carbonate rock layer.

8. The method of claim 1, wherein the control data comprises data indicative of at least one of:

a location for one or more injection wells;
a location for one or more production wells; or
a well completion configured to hydraulically isolate a second carbonate rock layer from direct hydraulic communication with an injection well.

9. The method of claim 1, wherein the characteristics of the injection water include one or more of a concentration of multivalent cation components, a concentration of sulfate ions, and a total dissolved solids (TDS) content of the injection water.

10. The method of claim 1, wherein the input data is further indicative of characteristics of the crude oil within the carbonate rock layers and wherein the input data indicative of characteristics of the crude oil is used to generate second data indicative of a predicted additional amount of oil.

11. The method of claim 10, wherein the characteristics of the crude oil include one or more of American Petroleum Institute (API) gravity, total acid number (TAN) value or total base number (TBN) value of the oil, and asphaltene and resin components of the oil.

12. The method of claim 1, wherein the input data is further indicative of characteristics of resident water within the carbonate rock layers, and wherein the input data indicative of characteristics of the resident water is used to model the dissolution of water-soluble sulfate minerals from the at least one of the one or more first carbonate rock layers into the injection water.

13. The method of claim 12, wherein the characteristics of the resident water include one or more of temperature, salinity, sulfate concentration and multivalent cation concentrations of the resident water.

14. The method according to claim 1, further comprising validating the one or more operating modes using a coreflood test wherein an aqueous displacement fluid comprising dissolved sulfate anions is injected into a core plug taken from a second carbonate rock layer of the reservoir or by performing a single well chemical tracer test on a well that penetrates the reservoir.

15. A non-transitory computer readable medium encoded with instructions arranged to cause a computer to perform the steps according to claim 1.

16. A non-transitory computer readable medium encoded with instructions arranged to cause a computer to perform the steps of claim 2.

17. A system for configuring a crude oil displacement system, the crude oil displacement system being arranged to inject an injection water into a reservoir, the reservoir comprising at least two carbonate rock layers having crude oil present within a pore space thereof, said crude oil displacement system being for use in displacing crude oil from the pore space of the carbonate rock layers, the system comprising:

an interface arranged to receive input data indicative of:
  i) characteristics of the injection water, comprising temperature, salinity, and sulfate concentration; and
  ii) characteristics of the carbonate rock layers comprising temperature, water permeabilities of the carbonate rock layers, water-soluble sulfate mineral content of the carbonate rock layers, and an indication of the water permeabilities of one or more interfaces between adjacent ones of the carbonate rock layers; and a processing system arranged to:
  operate a predictive model to:
    a) identify one or more first carbonate rock layers and one or more second carbonate rock layers of the at least two carbonate rock layers, the one or more second carbonate rock layers being adjacent to at least one of the one or more first carbonate rock layers, the one or more first carbonate rock layers having a water-soluble sulfate mineral content and the one or more second carbonate rock layers having a water-soluble sulfate mineral content, wherein the water-soluble sulfate mineral content of the one or more first carbonate rock layers is greater than the water-soluble sulfate mineral content of the one or more second carbonate rock layers;

b) model, using at least the data indicative of the characteristics of the injection water and of the characteristics of the carbonate rock layers, dissolution of water-soluble sulfate minerals from at least one first carbonate rock layer of the one or more first carbonate rock layers into the injection water that will occur on configuring the crude oil displacement system to inject said injection water into the at least one first carbonate rock layer, whereby to generate first data representing chemical characteristics of a sulfate enriched aqueous displacement fluid formed in the at least one first carbonate rock layer by the dissolution of water-soluble sulfate minerals into the injection water;

c) model, using at least the data indicative of the water permeabilities of the carbonate rock layers, flow of the sulfate enriched aqueous displacement fluid through the at least one first carbonate rock layer, whereby to generate first flow characteristics of the sulfate enriched aqueous displacement fluid;

d) model, using at least the data indicative of the water permeabilities of the carbonate rock layers, the water permeabilities of the one or more interfaces and the first flow characteristics, flow of the sulfate enriched aqueous displacement fluid from the at least one first carbonate rock layer into at least one second carbonate rock layer of the one or more second carbonate rock layers, whereby to generate second flow characteristics of the sulfate enriched aqueous displacement fluid; and e) generate, based on at least the first data and the modelled second flow characteristics, second data indicative of a predicted amount of oil that will be displaced from the at least one second carbonate rock layer by the sulfate enriched aqueous displacement fluid formed in the at least one first carbonate rock layer responsive to configuring the crude oil displacement system so as to inject the injection water into the at least one first carbonate rock layer; and determine, on the basis of the second data, one or more operating modes of the crude oil displacement system.

* * * * *